Aug. 12, 1924.

A. L. FISHER

GASKET

Filed Dec. 8, 1922

1,504,335

Ambrus Lee Fisher
INVENTOR

Patented Aug. 12, 1924.

1,504,335

UNITED STATES PATENT OFFICE.

AMBRUS L. FISHER, OF NEW ORLEANS, LOUISIANA.

GASKET.

Application filed December 8, 1922. Serial No. 605,667.

*To all whom it may concern:*

Be it known that I, AMBRUS L. FISHER, a citizen of the United States, residing at New Orleans, in the parish of Orleans and State of Louisiana, have invented new and useful Improvements in Gaskets, of which the following is a specification.

This invention relates to packings, particularly to gaskets and has for its object the provision of a novel metallic gasket designed for use in gas, steam or other lines and having a construction which makes it operate on the cushion principle, the device being highly efficient and being blow out proof, in addition to having the great advantage of simplicity of construction and cheapness in manufacture.

Figure 1:
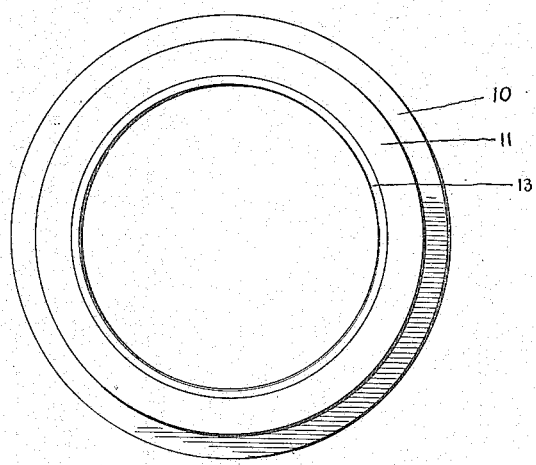
Figure 2:
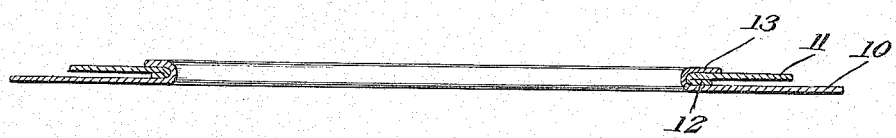

With the above and other objects and advantages in view the invention consists in the details of construction to be hereinafter more fully described and claimed and illustrated in the accompanying drawings, in which:

Figure 1 is an elevation of the gasket, Figure 2 is a cross section therethrough.

Referring more particularly to the drawings I have shown my gasket as comprising an outer or main ring member 10 formed of suitable sheet metal preferably copper, of any proper gage. Disposed against the ring 10 is a second ring 11 which has its outside diameter considerably less than the outside diameter of the ring 10. The inside edge of the ring 11 is bent over or spun to define a flange 12 which is disposed toward the ring 10, while the inside edge of the ring 10 is rolled, spun, crimped or pressed to define a flange 13 which extends about the inside edge of the ring 11 so as to hold the two members firmly together.

It will be observed that when the flange is constructed there will be a space between the members 10 and 11. It will also be apparent that owing to the provision of the bent back flange 12 there will be less resistance offered to compression of the gasket. It is also obvious that the increased compressibility at this point will increase the effectiveness so that an absolutely leak proof joint will be had which is particularly desirable for use in high pressure steam lines.

In use the gasket is disposed between the flanged meeting ends of whatever pipes are to be connected and it will be apparent that the cushion like nature of the gasket will give it sufficient resilience to make an absolutely tight packing at the joint. As the gasket is formed entirely of metal there is nothing to burn out and owing to the peculiar construction it is likewise apparent that there is nothing to blow out so that it should have the maximum efficiency and durability.

While I have shown and described the preferred embodiment of the invention it is of course to be understood that I reserve the right to make such changes in the form, construction and arrangement of parts as will not depart from the spirit of the invention or the scope of the subjoined claim.

Having thus described my invention I claim:

A gasket comprising a pair of ring members, one formed at its inner edge with a bead contacting with the other ring member to space the rings, and the other ring member having its inner edge formed with a bead pressed back to contact with the first named ring member on the side opposite the first named bead.

In testimony whereof I affix my signature.

AMBRUS L. FISHER.